United States Patent [19]
Berchielli

[11] 3,923,544
[45] Dec. 2, 1975

[54] ZINC ELECTRODE AND METHOD OF MAKING SAME

[75] Inventor: Aldo S. Berchielli, Westerly, R.I.
[73] Assignee: Electrochem, Inc., New York, N.Y.
[22] Filed: Mar. 11, 1974
[21] Appl. No.: 449,876

[52] U.S. Cl. .................................. 136/30; 136/31
[51] Int. Cl. .......................................... H01m 35/00
[58] Field of Search ............................. 136/30–31, 136/125–127, 130, 36, 64, 19, 35, 66, 75, 74, 46, 120 R

[56] References Cited
UNITED STATES PATENTS

| | | | |
|---|---|---|---|
| 1,576,974 | 3/1926 | Huebner | 136/31 |
| 1,918,947 | 7/1933 | Williams | 136/36 |
| 2,724,733 | 11/1955 | Hagspihl et al. | 136/19 |
| 2,738,375 | 3/1956 | Schlotter | 136/30 |
| 2,838,590 | 6/1958 | Garine | 136/30 |
| 2,865,974 | 12/1958 | Scheuerle et al. | 136/30 |
| 2,880,258 | 3/1959 | Pucher et al. | 136/30 |
| 2,931,846 | 4/1960 | Cunningham et al. | 136/30 |

*Primary Examiner*—Anthony Skapars
*Attorney, Agent, or Firm*—Donald E. Nist

[57] ABSTRACT

The present method provides an improved electrode for electrolytic cells which comprises, in combination, a porous metal grid, at least one solid strip of zinc metal disposed on said grid along an edge thereof, and a zinc oxide-containing shape-retaining particulate mixture covering at least one side of said grid and overlying said strip. The mixture includes a binder. A portion of the mixture overlying the grid has a density, for example, in excess of 2.5 grams per cc., which is higher than that of the remainder of the mixture. Preferably, a pair of solid zinc metal strips are disposed along the opposite edges of the grid and the mixture overlies both of the strips. Most preferably, the strips are wrapped around the edges and overlie opposite grid sides adjacent the edges. The strips may be about 2 – 15 mil thick each and have the advantage of preventing cell short circuiting, because of separator perforation, by the grid. They also obviate overcharging of the electrode and prevent electrode shape loss during use of the electrode. Such shape loss causes changes in electrical characteristics of the electrode.

12 Claims, 3 Drawing Figures

ZINC ELECTRODE AND METHOD OF MAKING SAME

BACKGROUND OF THE INVENTION

1. Field of the Invention

The present invention generally relates to electrodes and more particularly relates to zinc oxide-containing electrodes for electrolytic cells such as alkaline storage batteries and methods of making same.

2. Prior Art

Conventional zinc electrodes for alkaline batteries and the like usually comprise a porous grid of metal such as silver or copper which is overlaid on one or both sides by a zinc oxide-containing mixture containing a binder. The mixture is made up wet or dry and applied to the grid and then set to a shape-retaining form. Such conventional electrodes have a number of disadvantages. Certain of the electrodes initially do not have a sufficient amount of zinc metal present to operate properly. Accordingly, the electrode must be overcharged to in situ generate zinc metal from zinc oxide. Such overcharging has an effect of reducing the life of the electrode. Moreover, many of such electrodes include grids which are cut from sheets of porous grid material and have sharp spaced spears along the free edges thereof as a result of cutting through perforations in the grid. These prongs have a tendency to cause short circuiting within the cell, thus reducing its efficiency and power. Another defect of many conventional zinc electrodes is that during use they suffer a loss of a substantial amount of active material at their edges so that the shape of the electrode becomes irregular. Such change in shape changes the electrical characteristics of the electrode.

Accordingly, there has been a need for an improved type of zinc oxide-containing zinc electrode which is capable of retaining its shape during use, and has no need to be overcharged in order to operate properly. Such electrode should not be subject to the short circuiting defect commonly associated with electrodes employing cut grids.

SUMMARY OF THE INVENTION

The foregoing needs have been satisfied by the zinc electrode of the present invention and the present method. The electrode and method are substantially as set forth in the Abstract above. The metal grid of the electrode which is of non-corrodible metal, such as copper or silver, has one or more sides thereof protected by one or more solid zinc metal strips so that short circuiting is prevented. In a preferred embodiment, the metal strips are wrapped around the opposite sides of the grid to conceal the jagged edges of the grid and to more effectively protect the electrode and prevent both short circuiting and shape changing of the electrode during operation thereof in the electrolytic cell.

An important feature of the invention is that the portion of the mixture of zinc oxide and binder overlying each strip has a higher density than the remaining portion of the mixture, i.e., there is a higher mixture density adjacent the edges of the electrode than elsewhere. This assures that during operation of the electrode sufficient high density material is present to reduce materially the rate of shape change along the edges of the electrode, thus improving the functioning of the electrode over a period of use.

In accordance with the present method, the mixture of zinc oxide and binder is applied over the grid after the strips are placed in position on the grid. The mixture is then pressed into place, made into a uniform shape and set, as by drying or the like. Before such setting takes place, the electrode lead can be placed in position. The finished electrode has the improved properties and characteristics described more particularly in the following detailed description and drawings.

DRAWINGS

FIG. 1 schematically illustrates, in side elevation, a first embodiment of the electrode of the present invention, portions being broken away to illustrate certain internal features thereof;

FIG. 2 schematically illustrates a top plan view of the electrode of FIG. 1, portions being broken away to illustrate certain features; and, FIG. 3 schematically illustrates a top plan view of a second embodiment of the electrode of the invention, portions being broken away to illustrate internal features thereof.

DETAILED DESCRIPTION

Figure 1:
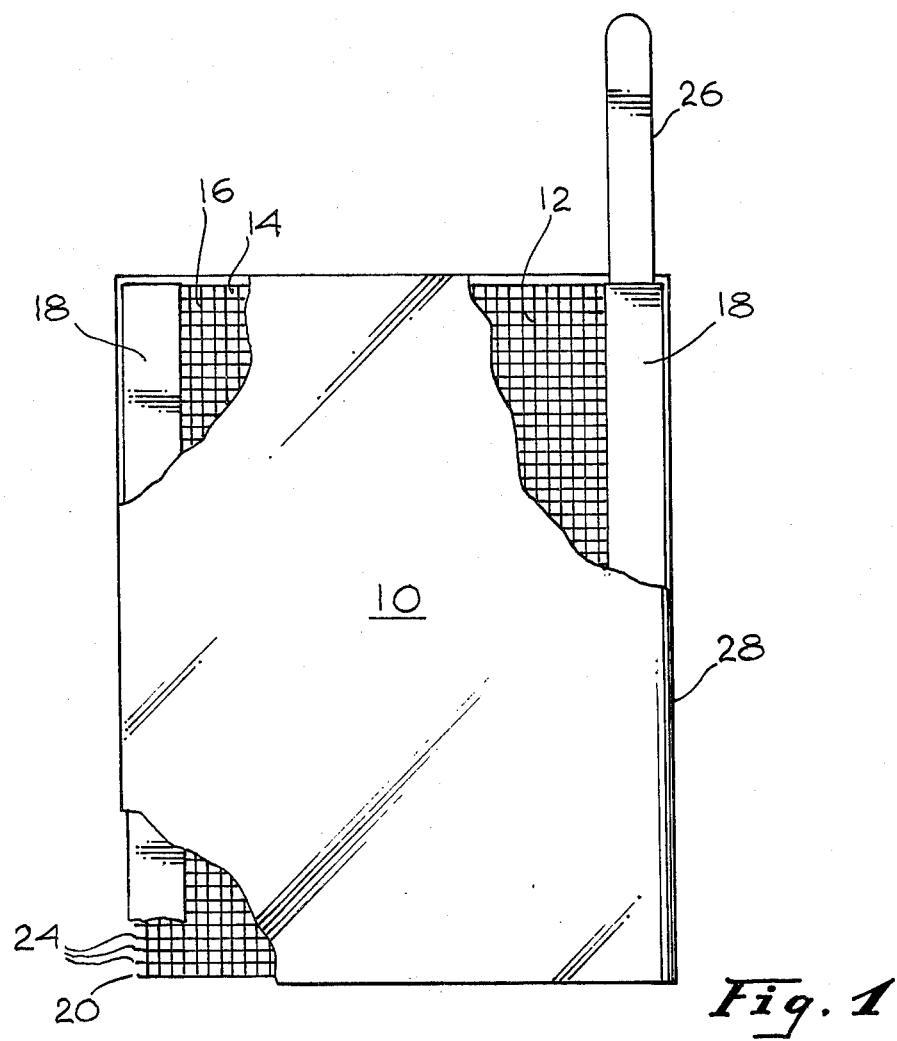
Figure 2:
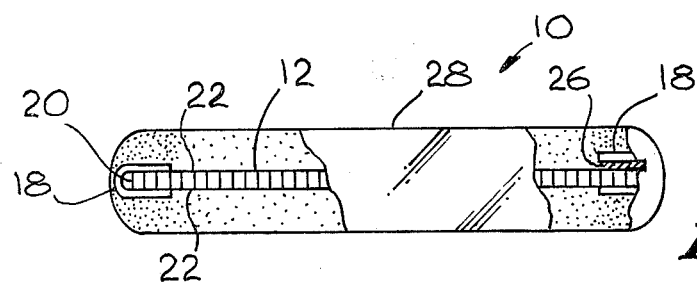

As shown schematically in FIGS. 1 and 2 of the drawings, an improved zinc electrode 10 in accordance with the present invention comprises a grid 12 which is fabricated of porous non-corrodible metal such as copper or silver, i.e., contains uniformly spaced apertures 14 defined by a metal lattice 16. The grid 12 may be, for example, about 2⅞ inches high and about 1⅞ inches wide with a thickness of about 0.010 inches with apertures of about 1/16 inch. It will be understood that other forms of the grid can be employed, depending upon the particular use to be made of the electrode.

The improved electrode 10 also includes a pair of strips 18 of solid zinc metal, each of which may be, for example, approximately 5 mils in thickness. Such thickness can vary from less than about 2 to over 15 mils or more depending on the particular application. As shown in FIG. 2, each strip 18 can be curved around a long edge 20 of the grid 12 so as to adjoin opposite sides 22 of the grid adjacent edge 20 and enclose edge 20 and prevent short circuiting in the electrode 10 by the sharp prongs 24 of edge 20 shown in FIG. 1.

A solid metal electrode lead 26 of non-corrodible metal such as copper or silver is disposed between one of the strips 18 and the grid 12, abutting both, as shown in FIG. 2. Such lead 26 can be of any suitable size and shape.

The electrode 10 also includes a continuous outer shell 28 adherent to the grid 12 and strips 18 and wholly enclosing the same. The shell 28 comprises a set shape-retaining mixture of particulate zinc oxide and binder. The binder may be, for example, tetrafluoroethylene, polyvinyl alcohol, polypropylene, polyethylene or the like plastic material, or carboxy methyl cellulose (CMC) or the like. Such material may be thermoplastic or thermosetting, and may be initially mixed into the zinc oxide in dry or in wet form, i.e., dissolved or dispersed in a solvent. The zinc oxide particles can have an average particle size of, for example, about 0.1 $\mu$ to about 0.5 $\mu$ (diameter), and the zinc oxide is usually present in a concentration, by weight, in the mixture of between about 85 and about 99.5%, depending on the type of binder and the end use of the electrode. The binder and zinc oxide are uniformly and thoroughly mixed together so that an essentially homogenous blend is obtained. Other materials, in addition to solvent or dispersant, can be added to the mixture before it is applied to the grid. Such materials may, for example, modify the physical, chemical and/or electrical properties of the electrode 10. Typically, rayon fibers, metallic powders (Ni, Zn, Ag, Cu) or finely chopped fibers and expanders can be added in amounts of from about 1.0 to about 10% by weight.

In accordance with the present method, the unset mixture of particulate zinc oxide and binder is applied around the grid 12 and strips 18 and is then pressed in place, fully shaped and then set to the form of the hard shape-retaining shell 28, as shown. The shell 28 tightly adheres to and holds the grid 12 and strips 18 in place. The pressing operation can be carried out in any suitable manner such that the portion of the mixture which overlies the strips reaches a higher density than the remainder of the mixture. This result is easily effected, for example, by applying a uniformly thick layer of the mixture over the grid and strip assembly and then pressing this layer down onto the grid 12 and strips 18 to form a flat surface parallel with the grid 12.

With such a technique, the portion of the layer overlying the strips 18 is thinner than the portion of the layer overlying the grid by an amount equal to the thickness of the strip 18 overlying the grid 12. Thus, the density of the finished set mixture is increased, for example, to about 2.5 or more in the area overlying the strips 18 while the density of the mixture only overlying the grid remains at, for example, about 1.8 gms/cc. The higher density mixture adjacent the long edges 20 is more durable and less subject to shape change than undensified material during use of the electrode. Moreover, the higher concentration of zinc-containing material in this area, due to the mixture and strips 18, eliminates the necessity of overcharging the electrode in order to have it function properly. Accordingly, electrode 10 has improved properties.

Figure 3:
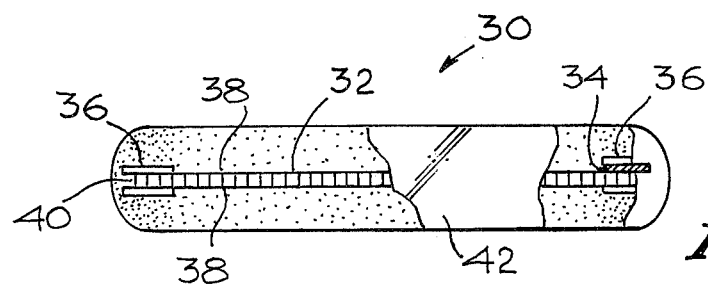

A second preferred embodiment of the electrode of the present invention is schematically depicted in top plan view in FIG. 3. As shown in FIG. 3, an electrode 30 is provided which includes a grid 32 similar to the grid 12, an electrode lead 34 is similar to the lead 26 and two pairs of zinc strips 36 similar to strips 18. The lead 34 is disposed between one of the strips 36 and the grid 32 adjacent one end of the latter. The strips 36 overlie both sides 38 of the grid 32 at opposite long edges 40 of the grid 32 to protect the edges 40 and reinforce the electrode 30. The grid 32, lead 34 and strips 36 are enclosed within a tightly adhering hard shell 42 comprising a set mixture of zinc oxide particles and binder. Electrode 30 has substantially the features of electrode 10.

Certain further features of the present invention are set forth in the following specific Example:

EXAMPLE

An improved electrode having the characteristics set forth in the Table below is provided:

TABLE

| Component | |
|---|---|
| Grid: | Copper metal |
| Size: | 1-7/8" × 2-7/8" |
| Type: | Perforated Beckley No. 2 Pattern |
| Lead: | Silver |
| Size: | 1/8"w × 3"l |
| Type: | Solid Silver sheet 005" thick |
| Strips: | Zinc |
| Shape: | "U" strip |
| Size: | 1/4"w × 2-7/8 |
| Number: | -2 |
| Particulate Mixture: | 10 Grams of Mix per Electrode |
| ZnO Particle Size: | 0.15 μ |
| Concentration: | 95% ZnO |
| Binder Type: | CMC |
| Concentration: | 0.5% |
| Solvent Type: | Water used to disperse CMC |
| Other Materials: | 1.0% Mercuric Oxide (HgO) as amalgamating agent |
| | 0.1% Rayon Fibers |

In accordance with the present method, the improved electrode is typically fabricated as follows:

1. Prepare a mixture of ZnO powder, HgO powder, rayon fibers, CMC binder and distilled water. Blend until uniform mixture is obtained.
2. Cast slurry to form thin strips of electrode material. Dry, and cut to size.
3. Prepare grid with welded tab and edge strips attached.
4. Make a sandwich consisting of a grid between two sheets of electrode material. Press composite at 2 tons-/in.² to a thickness of 0.040 inch.

The electrode exhibits the following electrical characteristics:

An electrode formed as described above is assembled into a Ag/Zn cell by positioning it between a pair of positive silver electrodes. The separator system for the cell is four layers of cellophane in the form of a U-wrap. The cell is charged at 0.2 amps equivalent to a current density of about 18 milliamps per square inch. The total input is 4.8 ampere hours. The cell is then discharged at 1.0 ampere to 1.0 volt cut-off. The average voltage is 1.52, under load, and the capacity of the cell (and therefore of the zinc electrode since the cell is zinc limited) is 4.0 ampere hours.

The improved electrode of the invention is durable, inexpensive and has improved electrical characteristics. Moreover, it can be easily made in accordance with the present method. Other advantages are as set forth in the foregoing.

Various modifications, changes and alterations can be made in the present method, its steps and parameters and in the present electrode and its components. All such modifications, changes and alterations as are within the scope of the appended claims form part of the present invention.

What is claimed:
1. An improved zinc electrode for electrolytic cells, said electrode comprising, in combination:
   a. a porous metal grid;
   b. at least one solid strip of zinc metal disposed on said grid along an edge thereof; and
   c. a zinc oxide-containing shape-retaining particulate mixture including a binder and covering at least one side of said grid and overlying said strip, the portion of said mixture overlying said strip having a substantially higher density than the remainder of said mixture.
2. The improved electrode of claim 1 wherein said higher density is in excess of 2.5 gm./cc.

3. The improved electrode of claim 1 wherein a pair of solid strips of zinc metal are disposed along opposite edges of said grid and said grid comprises noncorrodible metal.

4. The improved electrode of claim 3 wherein said mixture overlies opposite sides of said grid and both of said strips.

5. The improved electrode of claim 4 wherein the portion of said mixture which overlies each of said strips has a higher density than the remainder of said mixture.

6. The improved electrode of claim 5 wherein said higher density is in excess of 2.5 gm./cc.

7. The improved electrode of claim 1 wherein said strip is wrapped around said edge and overlies opposite sides of said grid adjacent said edge and wherein said grid comprises copper.

8. The improved electrode of claim 6 wherein each of said strips are about 2 – 15 mil thick, wherein said grid comprises silver and wherein said electrode is for use in an alkaline storage battery.

9. A method of making an improved electrode for electrolytic cells, said method comprising:

a. Disposing a solid strip of zinc metal along at least one edge of a porous metal grid;

b. Applying a mixture comprising zinc oxide particles and binder to said grid and over said strip and pressing said mixture to a uniform thickness over said grid and to a thickness over said strip which is less than said thickness over said grid by the thickness of said strip; and c. Setting said mixture into a shape-retaining-form, whereby an improved electrode is provided.

10. The method of claim 9 wherein a pair of said solid strips are disposed on opposite edges of said metal grid and wherein said mixture overlies both of said strips to a uniform thickness.

11. The method of claim 10 wherein each of said strips has a thickness of about 2 – 15 mil, wherein said grid comprises copper and wherein the density of the portion of said mixture overlying each of said strip is in excess of about 2.5 gm./cc.

12. The method of claim 9 wherein said strip is wrapped around said edge and overlies opposite sides of said grid adjacent said edge and wherein said grid comprises silver.

* * * * *